United States Patent [19]

Rolland et al.

[11] Patent Number: 4,725,953
[45] Date of Patent: Feb. 16, 1988

[54] SYSTEM FOR BRAKING A VEHICLE, MORE ESPECIALLY AN AIRCRAFT TRAVELLING OVER THE GROUND AND AN ANTI-LOCKING REGULATOR FOR THIS SYSTEM

[75] Inventors: Pierre-Charles Rolland; Alain Mottura, both of Toulouse, France

[73] Assignee: Societe Nationale Industrielle et Aerospatiale, Paris, France

[21] Appl. No.: 756,168

[22] Filed: Jul. 18, 1985

[30] Foreign Application Priority Data

Jul. 25, 1984 [FR] France .................................. 84 11805

[51] Int. Cl.⁴ ............................................. B60T 8/32
[52] U.S. Cl. ...................................... 364/426; 303/93; 303/95
[58] Field of Search ..................... 364/426; 303/93, 95; 361/238

[56] References Cited

U.S. PATENT DOCUMENTS 4,043,607  8/1977  Signorelli et al. ................. 303/100
4,367,529  1/1983  Masclet et al. ...................... 364/426
4,430,715  2/1984  Gentet et al. ....................... 364/426
4,468,740  8/1984  Beck et al. .......................... 364/426

Primary Examiner—Gary Chin
Attorney, Agent, or Firm—Fisher, Christen & Sabol

[57] ABSTRACT

A system is provided for braking a vehicle, more especially an aircraft travelling over the ground, comprising an anti-locking regulator preventing the braked wheels from locking and receiving the difference of signals delivered by a tachometric sensor coupled to a braked wheel and by a reference signal generator. Said anti-locking regulator further comprises digital calculating means capable of sequentially calculating the expression $$S = K0 + \frac{K1}{1 + t1p} + \frac{K2}{1 + t2p} + \ldots + \frac{Kn}{1 + tnp}$$

in which $K0, K1 \ldots Kn$ are constants, $t1, t2, \ldots tn$ are time constants and $p$ Laplace's variable.

5 Claims, 2 Drawing Figures

SYSTEM FOR BRAKING A VEHICLE, MORE ESPECIALLY AN AIRCRAFT TRAVELLING OVER THE GROUND AND AN ANTI-LOCKING REGULATOR FOR THIS SYSTEM

BACKGROUND OF THE INVENTION

The present invention relates to a system for braking a vehicle, more especially an aircraft running over the ground, as well as an anti-locking regulator for this braking system.

So as to prevent braked wheels from locking, aircraft braking systems comprise an anti-locking regulator for regulating the slippage, i.e. in reality servo-controlling the speed, of braked wheels. Such a regulator behaves like a filter capable, at least partially, of eliminating the parasite periodic signals tending to impair the regulation and of reinforcing the signals favorable thereto.

In known braking systems, the anti-locking regulator is formed by an analog device which receives analog signals representative, on the one hand, of the speed of a braked wheel and, on the other, of a reference speed such as the speed of an unbraked wheel and which sends a control signal to an electrohydraulic servovalve actuating the brakes. Such analog anti-locking regulators must be adapted to each type of brake or wheel used; in addition, because of the dispersion of the characteristics of their components, they require delicate adjustments. Furthermore, they cannot accomodate all the parameters coming into play during the braking of an aircraft, without extreme material complication.

To overcome these drawbacks, it would therefore be advantageous to replace these analog anti-locking regulators by digital anti-locking regulators which could be integrated with a processor. However, although digital tachometric sensors are at present known, the digital construction of anti-locking regulators raises technical difficulties, for it is not possible, as will be seen further on, to transpose analog anti-locking regulators purely and simply into digital form.

SUMMARY OF THE INVENTION

The purpose of the invention is to provide a digital anti-locking regulator.

To this end, in accordance with the invention, the system for braking a vehicle, more especially an aircraft running over the ground, comprising an anti-locking regulator for preventing braked wheels from locking and receiving the difference of the signals delivered by a tachometric sensor coupled to a braked wheel and by a reference signal generator, is remarkable in that said anti-locking regulator is formed by digital calculating means capable of sequentially supplying the expression S equal to $$K0 + \frac{K1}{1 + t1p} + \frac{K2}{1 + t2p} + \ldots + \frac{Kn}{1 + tnp}$$

in which $K0, K1, \ldots Kn$ are constants, $t1, t2, \ldots tn$ time constants and $p$ Laplace's variable.

In fact, experience has shown that a digital filter having a transfer function formed by the above expression would give results similar to those of the known analog anti-locking regulators mentioned above.

In practice moreover, the expression S may be limited to four terms and it is then equal to $$K0 + \frac{K1}{1 + t1p} + \frac{K2}{1 + t2p} + \frac{K3}{1 + t3p}$$

If we compare the analog anti-locking regulator known under the name of SPAD and the digital four term transfer function regulator in accordance with the invention, the different constants may be determined for obtaining similar results. This comparison leads to adopting the following values:

$K0 = 43.14$
$K1 = 32$
$K2 = 4.44$
$K3 = -56.08$
$t1 = 3$ s
$t2 = 2$ ms
$t3 = 1$ ms

It can therefore be seen that the values of constants K0 to K3 are high and that the values of the time constants t2 and t3 are very small with respect to the time constant t1.

Of course, the calculating means could calculate the different terms forming the transfer function from constants $ki$, $ti$ and $p$, then make the required addition. However, in order to lighten such calculations, it is preferable for said calculating means to operate with certain algorithms for avoiding these calculations and giving identical results.

For example, the term $$\frac{K1}{1 + t1p}$$

corresponding to the highest time constant t1 may be calculated using the known so-called "integrator" and "z bilinear" method which has the advantage of giving, not only under static but also dynamic conditions, results very close to theory.

In addition, the terms $$\frac{K2}{1 + t2p}$$

and $$\frac{K3}{1 + t3p}$$

corresponding to the lowest time constants t2 and t3, may be calculated in accordance with the so-called "sliding mean" method. In this method, each output $s_n$ of rank n is equal to the half sum of the input $e_n$ of rank n and of the input $e_{n-1}$ of rank $n-1$. The corresponding calculation algorithm is therefore very simple and results in very easy software implementation. This algorithm has a frequency response equivalent to that of a filter of the first order whose time constant is equal to half the sampling period.

The remark concerning the values of the constants allows the operation of the digital calculation means to be simplified by choosing a basic calculation pitch, for example 2 ms, for calculating the term $$\frac{Ki}{1 + tip}$$

corresponding to the smallest time constant and for calculating the other terms $$\frac{Ki}{1 + tip}$$

with a calculation pitch a multiple of the basic calculation pitch. For example, the term $$\frac{K3}{1 + t3p}$$

may be calculated at each basic 2 ms calculation pitch, whereas the term $$\frac{K2}{1 + t2p}$$

can only be calculated with a 4 ms calculation pitch (2 basic calculation pitches) and the term $$\frac{K1}{1 + t1p}$$

is only calculated with a 20 ms calculation pitch (10 basic calculation pitches).

Thus, the calculation means determine each term of the expression S, itself corresponding to an elementary filter, using an algorithm representative of the transfer function of the elementary filter.

Preferably, so as to take into account the fact that the values of the constants K0, K1, K2 and K3 are high, it is advantageous for said digital calculation means to operate in the following way:

(a) calculation of the term $$\frac{1}{1 + t1p},$$

then multiplication by the constant K1 so as to obtain $$\frac{K1}{1 + t1p};$$

(b) calculation of the term $$\frac{1}{1 + t2p},$$

then multiplication by the ratio K2/K3 so as to obtain $$\frac{K2}{K3} \cdot \frac{1}{1 + t2p}$$

(c) calculation of the term $$\frac{1}{1 + t3p};$$

(d) calculation of the sum $$S_1 = \frac{K0}{K3} + \frac{K2}{K3} \cdot \frac{1}{1 + t2p} + \frac{1}{1 + t3p}$$

(e) multiplication of said sum $S_1$ by the constant K3 so as to obtain the sum $S_2$ $$S_2 = K0 + \frac{K2}{1 + t2p} + \frac{K3}{1 + t3p}$$

(f) addition of $$\frac{K1}{1 + t1p}$$

to said sum $S_2$ so as to obtain the desired expression S.

The present invention further relates to an anti-locking regulator for a vehicle braking system, more especially for an aircraft travelling over the ground, so as to prevent the braked wheels from locking, receiving the difference of the signals delivered by a tachometric sensor coupled to a braked wheel and by a reference signal generator, said regulator being remarkable in that it is formed by digital calculation means capable of calculating sequentially the expression $$S = K0 + \frac{K1}{1 + t1p} + \frac{K2}{1 + t2p} + \ldots + \frac{Kn}{1 + tnp}$$

in which K0, K1 ... Kn are constants, t1, t2, ... tn time constants and p Laplace's variable.

In an advantageous embodiment said expression is equal to $$S = K0 + \frac{K1}{1 + t1p} + \frac{K2}{1 + t2p} + \frac{K3}{1 + t3p}$$

For operation thereof, said regulator must receive said signal difference in digital form. Consequently, it may be advantageous for the tachometric device coupled to the braked wheel and the reference signal generator to deliver their signals directly in digital form. However, said signals may be in analog form, provided that they undergo an analog-digital conversion before being introduced into said regulator.

BRIEF DESCRIPTION OF THE DRAWINGS

The invention will be better understood from the following description with reference to the accompanying drawings in which.

DESCRIPTION OF THE PREFERRED EMBODIMENT

Figure 1:
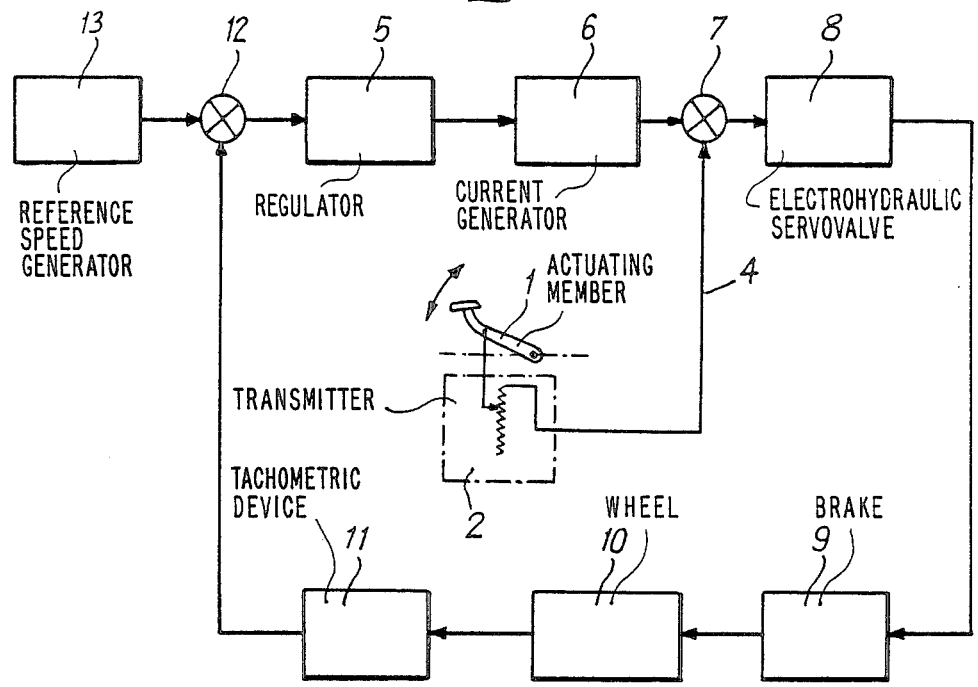
FIG. 1 is the block diagram of an automatic breaking system comprising an anti-locking regulator.

The braking regulation device for a vehicle whose block diagram is shown in FIG. 1 comprises an actuating member 1, for example a pedal, which is associated with a transmitter 2 for delivering an electric braking signal over a line 4. This braking device further comprises an anti-locking regulator 5 preventing the braked wheel (not shown) from locking and mounted in a servo-control loop formed by said braking device.

In this servo-control loop, the regulator 5 controls a current generator 6. The output current from generator 6 is combined, in a subtractor 7, with the electric braking signal from transmitter 2, so as to supply a control signal to an electrohydraulic servovalve 8. This latter delivers to brake 9 hydraulic pressure for braking the controlled wheel 9 travelling over the ground 10. The result of the action of the brake depends to a large extent on the contact conditions between the braked wheel and the ground, and this result is given by a tachometric device 11, coupled to said wheel and supplying at its output an electric signal representative of the instantaneous speed of the braked wheel.

This latter electric signal is compared, in a subtractor 12, with a reference speed delivered by a generator 13 (for example a tachometric device coupled to an unbraked wheel of said vehicle, inertia unit etc.).

In known braking devices, the block diagram of which is given in FIG. 1, the tachometric device 11 and the reference speed generator 13 deliver frequencies representative at all times of the speed of the vehicle and of the reference speed, these frequencies being converted into voltages delivered to subtractor 12. The anti-locking regulator 5 is therefore of the analog type.

The role of such an anti-locking regulator is to maintain the error signal delivered by the subtractor 12 as small as possible.

If we analyze this error signal it can be seen that it results from a plurality of parasite signals of well defined frequencies, some at least of which are characteristic of the vehicle, of the type of brake, of the servovalve, etc.

Consequently, so as to obtain braking servo-control which is as good as possible, it is indispensable to filter said parasite signals.

This filtering task is provided by said regulator 5 which behaves as a filter.

If we analyze mathematically the filtering action of the known analog type anti-locking regulator 5, it can be seen that it is equivalent to a filter whose transfer function T is equal to:

$$T = \frac{(1 + tap)(1 + tbp)(1 + tcp)}{(1 + tdp)(1 + tep)(1 + tfp)}$$

in which expression ta, tb, tc, td, te, and tf are time constants and p LaPlace's variable.

In order to benefit, in a braking system of the above described type, from the advantages provided by digital techniques (particularly the use of microprocessors), it would be advantageous to be able to construct the anti-locking regulator 5 in digital form, all the more so since tachometric devices are at present known capable of delivering speed information in digital form.

However, if it is desired to transpose the analog filter into digital form, insurmountable difficulties are met with due to the fact that:

the different time constants ta to tf are all more or less interrelated so that adjustment of the filter is delicate, the values of these time constants are very variable, from 1 ms to several seconds, and the dynamics of the filter is considerable, greater than 60 dB.

To overcome these difficulties, in accordance with the invention, the anti-locking regulator 5 is provided with a transfer function which lends itself particularly well to digital construction and which, as experience has shown, gives results similar to those of the analog construction.

According to the invention, the anti-locking regulator 5 is given the structure of calculating means, advantageously of the processor type, able to reproduce the expression $$K0 + \frac{K1}{1 + t1p} + \frac{K2}{1 + t2p} + \ldots + \frac{Kn}{1 + tnp}$$

or more simply $$K0 + \frac{K1}{1 + t1p} + \frac{K2}{1 + t2p} + \frac{K3}{1 + t3p}$$

Figure 2:
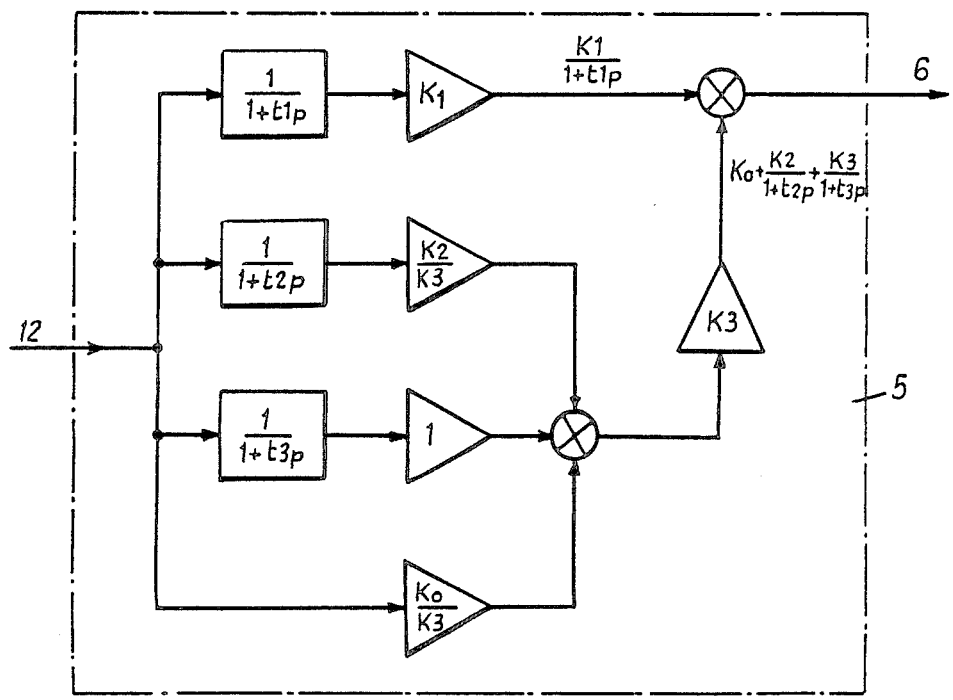
FIG. 2 illustrates the architecture for calculating the anti-locking regulator of the invention.

As illustrated in FIG. 2, for the reasons already set out, it is advantageous during calculation of this latter expression:

to calculate $$\frac{1}{1 + t1p},$$

then $$\frac{K1}{1 + t1p}$$

to calculate $$\frac{1}{1 + t2p},$$

then $$\frac{K2}{K3} \cdot \frac{1}{1 + t2p}$$

to calculate $$\frac{1}{1 + t3p}$$

to add algebraically $$\frac{K0}{K3} + \frac{K2}{K3} \cdot \frac{1}{1 + t2p} + \frac{1}{1 + t3p}$$

to multiply this latter expression by K3 finally to add $$\frac{K1}{1 + t1p} \text{ and } K0 + \frac{K2}{1 + t2p} + \frac{K3}{1 + t3p}$$

The digital filter obtained in accordance with the invention is faster than the corresponding analog filter, which results in an appreciably better low speed regulation.

The multiple adjustment possibilities of the digital filter confer thereon performance or regulation characteristics better than those of the analog filter.

What is claimed is:

1. A system for braking at least one wheel (10) of a vehicle, more especially an aircraft travelling over the ground, said system comprising:

an actuator member (1) associated to a transmitter (2), which generates an electrical braking signal which is representative of the movement of said actuating member (10);

an electrohydraulic servovalve (8) controlling a brake (9) acting on said wheel (10);

a tachometric device (11) associated to said wheel (10) and delivering a digital tachometric signal;

a reference speed generator (13) delivering a digital speed signal;

a first subtractor (12) receiving said digital tachometric signal and said digital speed signal and delivering a digital difference signal thereof;

a regulator (5) for preventing the braked wheel (10) from locking and receiving said digital difference signal for regulating said digital difference signal, said regulator (5) having the following transfer function $$S = K0 + \frac{K1}{1 + t1p} + \frac{K2}{1 + t2p} + \cdots + \frac{Kn}{1 + tnp}$$

in which K0, K1, ... Kn are constants, t1, t2 ... tn are time constants and p LAPLACE's variable;

a current generator (6) controlled by said regulator (5) and delivering an electrical regulation signal; and a second subtractor (7) receiving said electrical regulation signal and said electrical braking signal and controlling said electrohydraulic servovalve based on a different signal generated by said second subtractor.

2. The braking system as claimed in claim 1, wherein the transfer function is equal to $$S = K0 + \frac{K1}{1 + t1p} + \frac{K2}{1 + t2p} + \frac{K3}{1 + t3p}$$

3. The braking system as claimed in claim 2, wherein the different constants have the following values:
K0=43.14
K1=32
K2=4.44
K3=−56.08
t1=3 s
t2=2 ms
t3=1 ms.

4. An antilocking regulator (5) for a system for braking at least one wheel (10) of a vehicle, more especially an aircraft travelling over the ground, said system comprising:

an actuating member (1) associated to a transmitter (2), which generates an electrical braking signal which is representative of the movement of said activating member (1);

an electrohydraulic servovalve (8) controlling a brake (9) acting on said wheel (10);

a tachometric device (11) associated to said wheel (10) and delivering a digital tachometric signal;

a reference speed generator (13) delivering a digital speed signal;

a first subtractor (12) receiving said digital tachometric signal and said digital speed signal and delivering a digital difference signal thereof;

a current generator (6) controlled by said regulator (5) and delivering an electrical regulation signal; and a second subtractor (7) receiving said electrical regulation signal and said electrical braking signal and controlling said electrohydraulic servovalve based on a different signal generated by said second subtractor, said regulator (5) being provided for preventing the braked wheel (10) from locking, receiving said digital difference signal for regulating said digital difference signal, and having the following transfer function $$S = K0 + \frac{K1}{1 + t1p} + \frac{K2}{1 + t2p} + \cdots + \frac{Kn}{1 + tnp}$$

in which K0, K1, ... Kn are constants, t1, t2 ... tn are time constants and p LAPLACE's variable.

5. The regulator as claimed in claim 4 wherein the transfer function is:

$$S = K0 + \frac{K1}{1 + t1p} + \frac{K2}{1 + t2p} + \frac{K3}{1 + t3p}.$$

* * * * *